(12) United States Patent
Hoen

(10) Patent No.: US 6,253,001 B1
(45) Date of Patent: Jun. 26, 2001

(54) OPTICAL SWITCHES USING DUAL AXIS MICROMIRRORS

(75) Inventor: Storrs T. Hoen, Brisbane, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/488,344

(22) Filed: Jan. 20, 2000

(51) Int. Cl.⁷ ................................................. G02B 6/26
(52) U.S. Cl. ........................... 385/17; 385/16; 385/18; 385/19
(58) Field of Search ........................ 385/16, 17, 18, 385/19, 20, 25, 31; 359/291, 224, 223, 292

(56) References Cited

U.S. PATENT DOCUMENTS

| | | | |
|---|---|---|---|
| 4,754,185 | 6/1988 | Gabriel et al. | 310/309 |
| 5,378,954 | 1/1995 | Higuchi et al. | 310/309 |
| 5,534,740 | 7/1996 | Higuchi et al. | 310/309 |
| 5,872,880 | * 2/1999 | Maynard | 385/19 X |
| 5,960,133 | * 9/1999 | Tomlinson | 385/18 |
| 5,986,381 | 11/1999 | Hoen et al. | 310/309 |

OTHER PUBLICATIONS

Niino, Toshiki et al., "Dual Excitation Multiphase Electrostatic Drive," IEEE, 1995, pp. 1318–1325.
Niino, Toshiki et al., "Development of an Electrostatic Actuator Exceeding 1ON Propulsive Force," IEEE, 1992, pp. 122–1127.
Niino, Toshiki et al., "High–Power and High–Efficiency Electrostatic Actuator," IEEE, 1993, pp. 136–241.
Trimmer, W.S.N., "Design Considerations for a Practical Electrostatic Micro–Motor," Sensors and Actuators, 11, 1987, pp. 189–206.

* cited by examiner

Primary Examiner—Phan T. H. Palmer

(57) ABSTRACT

In a first embodiment of an optical switch having at least one dual axis micromirror, the micromirror is manipulated about two generally perpendicular axes by varying voltage patterns along two electrostatic arrangements. The two electrostatic arrangements may be formed to independently drive two movers, or may be formed to control a mover that is displaceable in two directions. The micromirrors and the movers that control the micromirrors may be integrated onto a single substrate. Alternatively, the micromirrors may be formed on a substrate that is attached to the substrate that includes the mover or movers. In a second embodiment of an optical switch in accordance with the invention, the switch includes two collimator arrays and two dual axis micromirror arrays. Each first micromirror in the first micromirror array is dedicated to one of the collimators in the first collimator array. Similarly, each second micromirror of the second micromirror array is dedicated to one of the collimators of the second collimator array. By manipulating a first micromirror, an input signal from the associated first collimator can be reflected to any of the second micromirrors. By manipulating the second micromirror that receives the signal, the signal can be precisely positioned on the second collimator that is associated with the second micromirror.

19 Claims, 12 Drawing Sheets

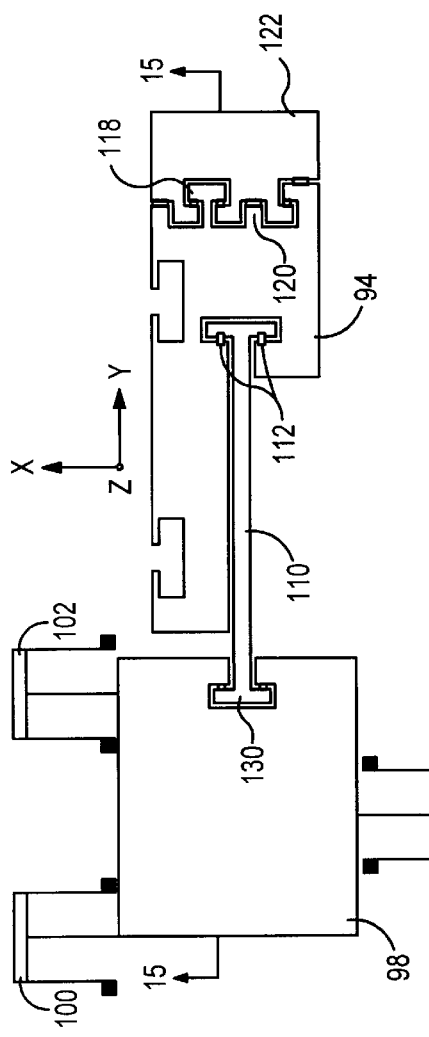
FIG. 14
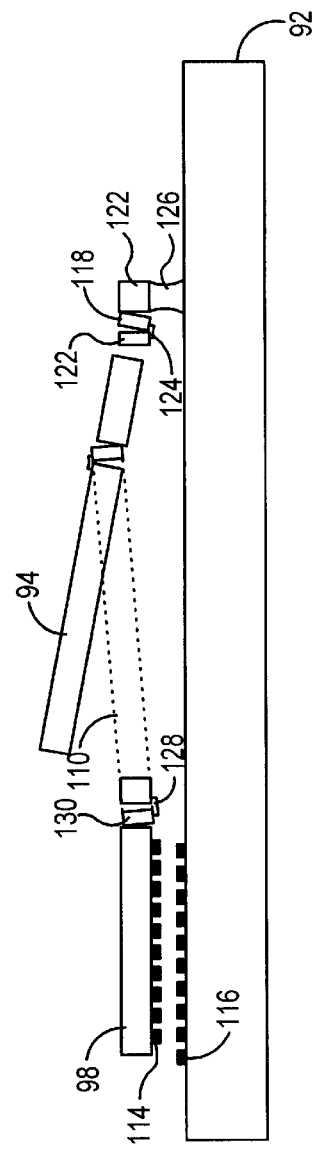
FIG. 15
FIG. 16

OPTICAL SWITCHES USING DUAL AXIS MICROMIRRORS

TECHNICAL FIELD

The invention relates generally to optical switches and more particularly to optical cross-connected switches having micromirrors that are individually manipulated.

BACKGROUND ART

Continuing innovations in the field of fiberoptic technology have contributed to the increasing number of applications of optical fibers in various technologies. With the increased utilization of optical fibers, there is a need for efficient optical devices that assist in the transmission and the switching of optical signals. At present, there is a need for optical switches that direct light signals from an input optical fiber to any one of several output optical fibers, without converting the optical signal to an electrical signal.

The coupling of optical fibers by a switch may be executed using various methods. One method of interest involves employing a micromirror that is placed in the optical path of an input fiber to reflect optical signals from the input fiber to one of alternative output fibers. The input and output fibers can be either uni-directional or bidirectional fibers. In the simplest implementation of the mirror method, the input fiber is aligned with one of two output optical fibers, such that when the mirror is not placed in the optical path between the two fibers, the aligned fibers are in a communicating state. However, when the mirror is placed between the two aligned fibers, the mirror steers (i.e., reflects) optical signals from the input fiber to a second output fiber. The positioning of the mirror relative to the path of the input fiber can be accomplished by using an apparatus that mechanically moves the mirror. There are number of proposals to using micromachining technology to make optical signals. In general, the proposals fall into two categories: in-plane free-space switches and in-plane guided wave switches. Free-space optical switches are limited by the expansion of optical beams as they propagate through free space. For planar approaches, the optical path length scales linearly with the number of input fibers. Switches larger than 30×30 require large mirrors and beam diameters on the order of 1 millimeter (mm). For these planar approaches, the number (N) of input fibers scales linearly with the beam waist and the size of the optical components. Thus, the overall switch size grows as $N^2$. It is estimated that a 100×100 switch would require an area of 1 $m^2$, which would be a very large switch. Moreover, constraints such as optical alignment, mirror size, and actuator cost are likely to limit the switch to much smaller sizes. One planar approach claims that the optical switch can be designed so that it scales with the optical path difference, rather than the overall optical path. If this is possible, it would certainly allow larger switches. However, the optical path difference also scales linearly with the number of input fibers for a planar approach, so the switch grows very large as it is scaled to large fiber counts.

For guided wave approaches, beam expansion is not a problem. However, loss at each cross point and the difficulty of fabricating large guided wave devices are likely to limit the number of input fibers in such switches.

For both approaches, constraints such as loss, optical component size, and cost tend to increase with the number of fibers. There is a need for an optical cross connect switch which scales better with the number of input and output fibers. Some free-space optical systems can achieve better scaling. These systems make use of the fact that it is possible to use optical steering around in two directions to increase the optical fiber count. Recently, optical switches that use such mirrors have been announced. The systems use piezoelectric elements or magnetically or electrostatically actuated micromirrors. The actuation method for these approaches is often imprecise. To achieve a variable switch, it is typically necessary to use a very high level of optical feedback.

What is needed is a micromachine that enables steering of optical signals from at least one input to a number of alternative outputs, where the arrangement of the outputs is not limited to a linear configuration. What is further needed is a method of fabricating and arranging arrays of the micromachines such that the switching is accurate and repeatable.

SUMMARY OF THE INVENTION

In one embodiment of an optical switch, a micromachine for steering optical signals includes utilizing electrostatic forces to manipulate a dual-axis micromirror. The micromirror is supported adjacent to a substrate to enable movement of the micromirror relative to the substrate. A first surface electrostatic arrangement is configured to generate electrostatic forces for rotating the micromirror about a first axis. Similarly, a second surface electrostatic arrangement is configured to generate electrostatic forces for rotating the micromirror about a second axis. The two electrostatic arrangements may be used to drive a single mover that controls the positioning of the micromirror, or may be used to drive separate movers.

Preferably, an array of micromirrors is formed on a substrate. In one application, the micromirrors are formed separately from the electrostatically driven movers. For example, a micromirror substrate may be formed to include an array of micromirrors in a side-by-side relationship, with the micromirrors being supported to allow rotation about perpendicular first and second axes. The micromirror substrate may then be attached to a mover substrate on which the movers are incorporated, such that the micromirrors are generally parallel to the paths of the movers. Each micromirror may be connected to a projection that extends toward the mover substrate and that is controlled by at least one of the movers. In this embodiment, the movers manipulate the projections in a manner similar to manipulation of joysticks.

In another embodiment, the micromirrors and movers are integrated onto a single substrate. Each micromirror may be supported on the substrate by means of a frame. A first mover is driven by electrostatic forces to manipulate the position of the frame, thereby rotating the micromirror about one axis. A second electrostatically driven mover may be connected to the micromirror to rotate the micromirror about the second axis. However, there may be embodiments in which a single mover is used to control rotations about both axes. For example, the mover may be electrostatically driven in two perpendicular directions.

Each surface electrostatic arrangement includes at least two sets of electrodes. For a particular surface electrostatic arrangement, a first set of drive electrodes may be formed along a surface of a mover, while a second set of drive electrodes is formed along a surface of the substrate. The lengths of the electrodes are perpendicular to the direction of travel by the mover. The drive electrodes are electrically coupled to one or more voltage sources that are used to provide an adjustable pattern of voltages to at least one of the sets of drive electrodes. The change in the electrostatic force that results from variations in the voltage patterns causes movement of the mover. As an example, the first set of drive electrodes may be electrically connected to a voltage source that provides a fixed pattern of voltages, while the second set is electrically connected to a microcontroller that is configured to selectively apply different voltages to the individual drive electrodes. The reconfiguration of the applied voltage pattern modifies the electrostatic forces between the substrate and the mover, thereby laterally displacing the mover.

Each surface electrostatic arrangement preferably includes levitator electrodes on the same surfaces as the drive electrodes. Unlike the drive electrodes, the levitator electrodes are positioned with the length of the electrodes parallel to the direction of travel by the mover. An acceptable fixed voltage pattern along the levitator electrodes is one that alternates between high and low voltages. Repulsive electrostatic forces between the levitator electrodes cause the mover to be spaced apart from the substrate. Since the levitator electrodes are parallel to the travel direction of the mover, the levitator electrodes are not misaligned when the mover is displaced laterally. Moreover, the repulsive electrostatic forces generated between the two sets of levitator electrodes operate to negate any attractive forces generated by the drive electrodes.

In a separate embodiment of the invention, an optical switch is configured to include two separate arrays of dual axis micromirrors and two separate arrays of optical signal conductors, such as collimators. One of the arrays of micromirrors is positioned relative to a first collimator array such that each dual axis micromirror is dedicated to one of the collimators to receive incident optical signals. The second array of micromirrors is positioned relative to the first micromirror array to allow an optical signal reflected at the first array to be directed to any one of the micromirrors of the second array. That is, by manipulating a particular dual axis micromirror in the first array, an optical signal incident to the particular micromirror can be reflected to any one of the micromirrors of the second array. The second collimator array is positioned relative to the second array of micromirrors such that the optical signal reflected by a micromirror of the second array is directed to an associated one of the collimators in the second collimator array. That is, the micromirrors of the second array are uniquely associated with the collimators of the second array, but can be manipulated to provide compensation for the angle of the beam from the first array. In this embodiment of the optical switch, the manipulation of micromirrors may be accomplished by means other than electrostatic forces, without diverging from the invention.

Returning to the embodiment in which the manipulation of the micromirrors is implemented by varying generated electrostatic forces, a method of fabricating optical micromachines includes forming surface electrostatic movers on a surface of a substrate and includes supporting micromirrors relative to the substrate such that each micromirror is rotatable about substantially perpendicular first and second axes and is manipulable by movement of at least one of the movers. As previously noted, the movers and the micromirrors may be formed on separate substrates or may be integrally fabricated on a single substrate. The movers and the mover substrate include the arrays of drive electrodes and levitator electrodes. The electrostatic surface actuation method is well suited for the positioning of micromirrors within the described optical switch, since each micromirror may be tilted to approximately 10° on each of the two axes and is relatively large from a micromachine perspective. A micromirror may be on the order of approximately 1 mm wide. The mover that drives a micromirror can be displaced along actuation distances of approximately 100 $\mu$m, with very precise and repeatable positioning. Adequate electrostatic forces may be generated using voltages of 12 volts or lower. The low voltage operation allows the optical switch to be coupled with complementary metal-oxide semiconductor (CMOS) circuitry.

BRIEF DESCRIPTION OF THE DRAWINGS

FIG. 14 is a top view of one of the movers and a frame of the micromachine of FIG. 13.

FIG. 15 is a side view of the mover and frame of FIG. 14, shown in a rest position.

FIG. 16 is a side view of the mover and frame of FIG. 15, but shown in an operational state.

DETAILED DESCRIPTION

Figure 1:
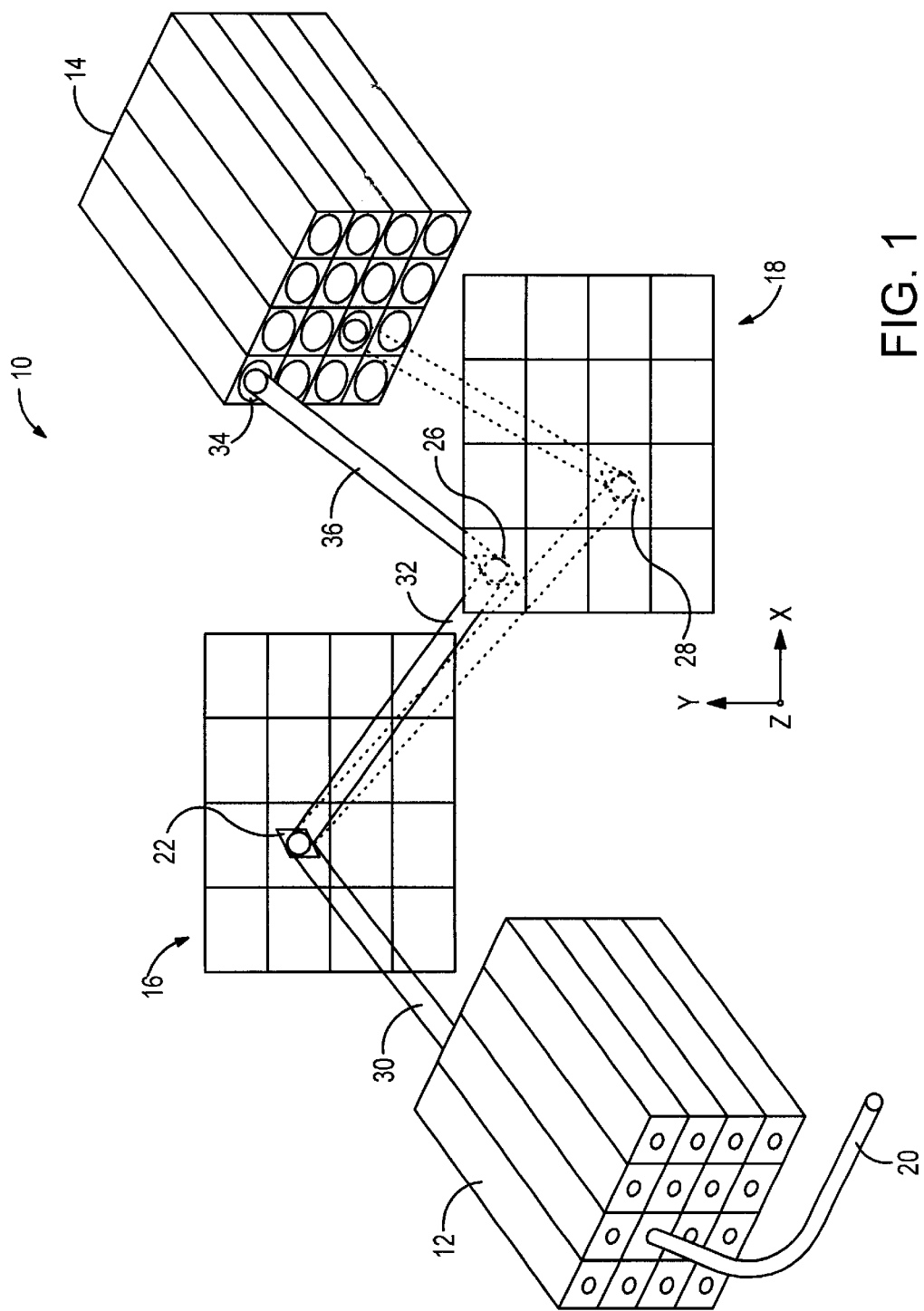
FIG. 1 is a schematic diagram of a 16×16 optical switch using dual axis micromirror arrays in accordance with the invention.

With reference to FIG. 1, an optical switch 10 is shown as including a first collimator array 12, a second collimator array 14, a first micromirror array 16, and a second micromirror array 18. The optical cross-connect switch utilizes dual axis micromirrors to deflect input optical beams to any one of the output optical elements. In the description of FIG. 1, the first collimator array 12 will be described as comprising the input elements and the second collimator array 14 will be described as comprising the output elements. However, this is not critical. The individual conductors may be bi-directional elements, so that optical signals propagate in both directions. Moreover, the use of collimators is not critical if other means of controlling beam expansion can be substituted.

A single optical fiber 20 is shown as being connected to the first collimator array 12. In practice, there is likely to be sixteen optical fibers connected to the 4×4 array. The number of elements in the array is not critical to the invention. The essential aspect of the optical switch is that each micromirror is individually manipulable along two physical axes. In FIG. 1, only one micromirror 22 is shown in the first array 16 and only the two micromirrors 26 and 28 are shown in the second array 18. However, there is a separately manipulable dual axis micromirror for each of the sixteen segments of the first array and each of the sixteen segments of the second array.

Each input fiber, such as the fiber 20, is coupled to its own collimator in the first collimator array 12. An input optical signal 30 from the fiber 20 exits from the collimator array 12 as a slightly converging beam. The converging beam is directed to be incident to a particular micromirror 22 in the first micromirror array 16. Thus, each micromirror in the first array is dedicated to one of the collimators. However, each micromirror is manipulated to redirect an incident beam to any one of the micromirrors in the second array 18. For example, the dashed lines from the micromirror 22 of the first array 16 to the micromirror 28 of the second array 18 represents a redirection of the input beam 30 as a result of manipulation of the micromirror 22. In the preferred embodiment, the manipulation of a micromirror, such as micromirror 22, is achieved using electrostatic forces. Nevertheless, other approaches may be employed.

When the micromirror 22 is pivoted along one of its axes, the reflected beam 32 will sweep horizontally across the second micromirror array 18. On the other hand, when the micromirror 22 is pivoted about its second axis, the reflected beam 32 will sweep vertically across the second array 18. Each of the micromirrors, such as micromirror 26, in the second array is dedicated to one of the collimators of the second collimator array 14. The dual axis capability of the second micromirrors allows each micromirror to be precisely positioned, so as to compensate for the angle at which the beam arrives from a particular micromirror of the first micromirror array 16. Thus, the micromirror 26 is precisely positioned about each of its two axes of rotation and redirects the optical beam 36 to the corresponding collimator 34 in the array 14. The rotation of micromirror 26 depends upon which micromirror of the first array 16 is directing an optical beam to micromirror 26. The optical switch 10 of FIG. 1 is symmetrical, so that light beams can pass equally efficiently in either direction.

Figure 2:
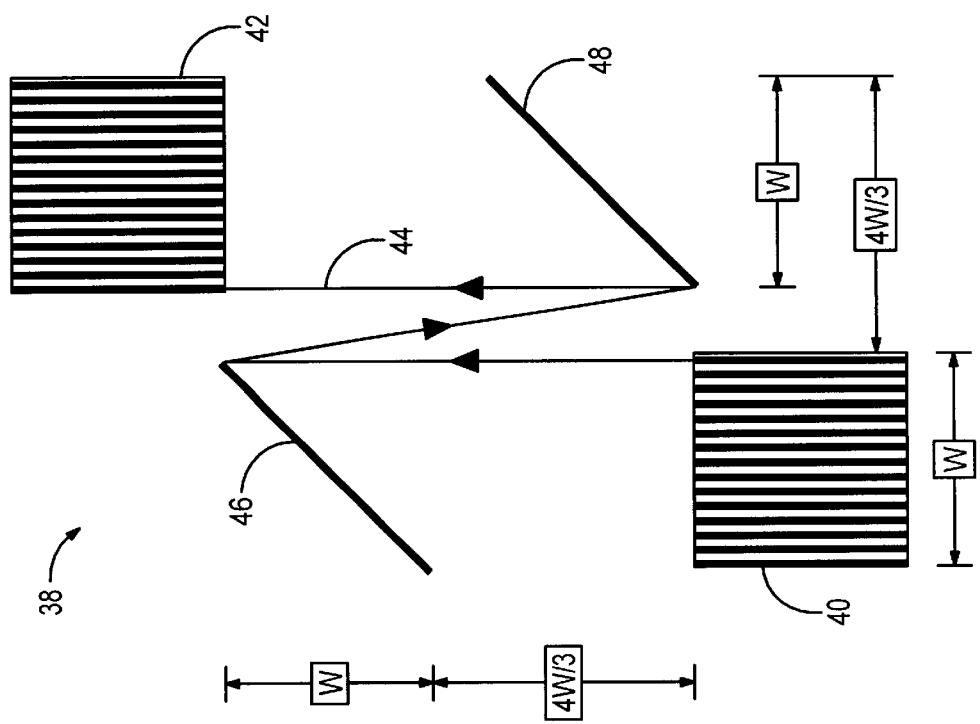
FIG. 2 is a top view of a schematic representation of a first embodiment for positioning two arrays of dual axis micromirrors in accordance with the invention.

As will be explained more fully below, one feature of the three-dimensional nature of the design of FIG. 1 is that it is possible to easily vary the scale of the optical switch 10 to accommodate very large fiber counts. FIG. 2 illustrates a top view of an optical switch 38. No particular number of input and output ports is intended to be shown in the drawing. Rather, FIG. 2 shows the locations of various optical elements in order to determine the relationship between the width of the collimator array and the maximum optical path length. All of the indicated dimensions of the switch are referenced to the width (W) of the collimator arrays 40 and 42. Also shown in the figure is the longest optical path 44 that can occur when switching any one of the input collimators to any one of the output collimators. In this design, the longest optical path is 7.3 W. The relationship between the longest optical path and the size of the collimator arrays places a limit on the number of optical fibers that can be coupled with a particular beam width. Table 1 summarizes the constraints placed on the optical switch by the angular divergence of a Gaussian beam traveling in free space. The parameter $\sqrt{A}$ characterizes the radial index profile in the graded index (GRIN) lens (i.e., $n(r)=n_o \times (1-Ar^2/2)$). A suitable manufacturer of graded index lenses is NSG America, Inc. in Somerset, N.J.

TABLE 1

| Parameter | Commercial GRIN Lens Collimators | | |
| --- | --- | --- | --- |
| | 1.0 mm diameter $\sqrt{A} =$ 0.481/mm | 2.0 mm diameter $\sqrt{A} =$ 0.237/mm | 4.0 mm diameter $\sqrt{A} =$ 0.148/mm |
| Maximum symmetrical beam length (mm) | 99 | 407 | 1041 |
| Associated waist ($\mu$m) | 156 | 317 | 507 |
| Crossconnect size | 121 × 121 | 625 × 625 | 1156 × 1156 |
| Collimator array width (mm) | 13.2 | 56 | 143 |
| System size (l × w × h, cm³) | 6 × 3 × 1.5 | 25 × 13 × 6 | 62 × 34 × 15 |

For a given collimator, there is a maximum length that an optical beam can travel and have the same waist at both ends of the beam. This length is called the maximum symmetrical beam length in Table 1, and it grows approximately as the square of the collimator diameter. Since the optical path in the system 38 grows linearly with the collimator diameter, it is always possible to achieve larger fiber counts by using larger collimators. This fact is borne out in Table 1, where 1.0 mm diameter collimators can be used to achieve a 121×121 switch, while 4.0 mm collimators can be used to achieve a 1000×1000 switch at the expense of increased optical system size. The number of fiber inputs should increase approximately as the square of the collimator diameter, assuming that the waist of the beam leaving the collimator scales as the diameter of the collimator. This is not indicated by the three collimators analyzed for Table 1, presumably because of the difficulties in doping the GRIN lenses.

Figure 3:
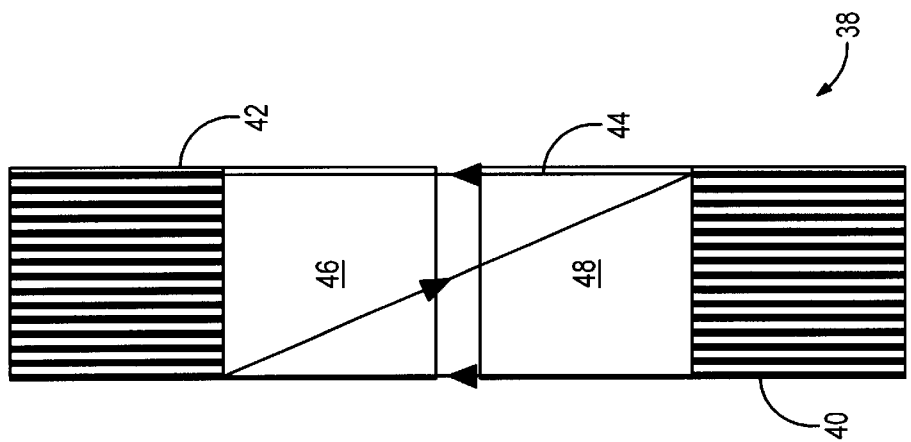
FIG. 3 is a side view of the representation of FIG. 2.

FIG. 3 is a side view of the optical switch 38 of FIG. 2. In the two figures, the first and second micromirror arrays 46 and 48 are shown as being planar devices and individual micromirrors are not shown. However, the individually manipulated micromirrors are incorporated into the two arrays 46 and 48 so that any one of the input collimators in the collimator array 40 can be optically coupled to any one of the collimators in the collimator array 42.

Figure 5:
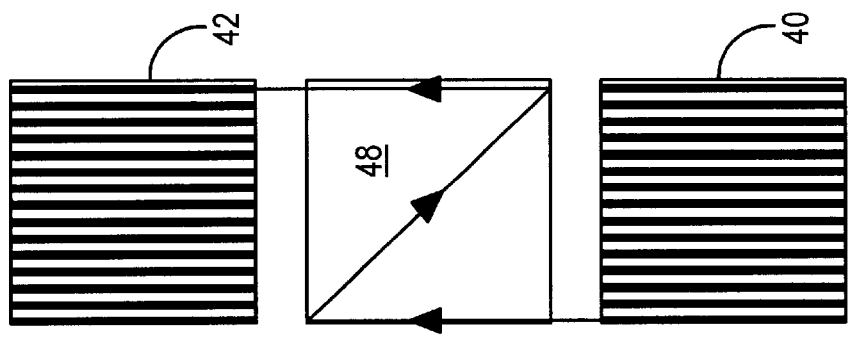
FIG. 5 is a side view of the representation of FIG. 4.
Figure 4:
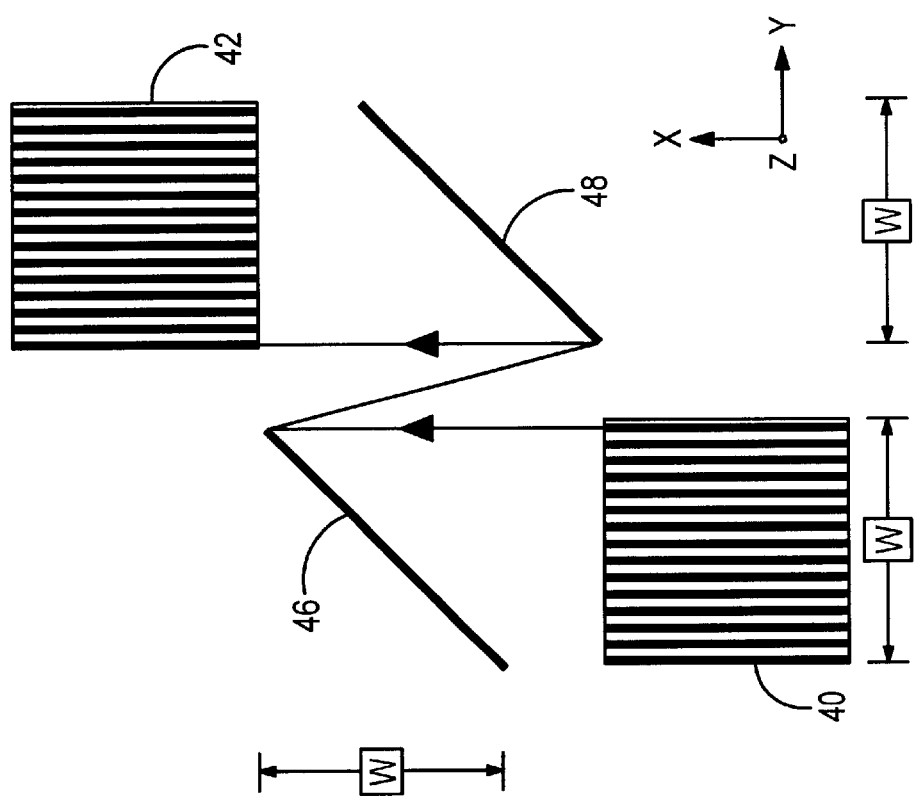
FIG. 4 is a top view of a second embodiment for positioning dual axis arrays of mirrors in accordance with the invention.

There are a number of available methods for increasing the fiber count for a selected collimator array size. Firstly, the system may be made slightly asymmetrical by allowing the optical beam to travel more than the maximum symmetrical beam length shown in Table 1. However, this method has an associated increase in optical losses and crosstalk. Secondly, a different switch geometry can be used, such as that shown in the top view of FIG. 4 and the side view of FIG. 5. While the geometry is different, the components are substantially identical, so the reference numerals of FIGS. 2 and 3 are also used in FIGS. 4 and 5. In the embodiment of FIGS. 4 and 5, the maximum beam length is only 4.1 W. In this case, the 4.0 mm GRIN lens could be used to create a 3,600×3,600 switch. This system design places more difficult requirements on the micromirrors of the arrays 46 and 48. Most notably, the micromirrors must be able to rotate into the plane of the substrate on which the micromirrors are formed.

A third method of increasing the fiber count would be to use more efficient collimators for which the output waist is a larger fraction of the collimator diameter. A fourth method would be to use a close-packed fiber array, rather than the square array shown in FIG. 1. Close packing, however, would only increase the number of optical fibers by 15%, and it would make the tiling to be described below more difficult to implement. A fifth method is to very accurately control the curvature of the micromirrors, so that they can operate as focusing elements to compensate for the Gaussian beam expansion. A theoretical sixth method would be to use optics in the input and output stages, so that the switch would scale with the optical path difference, rather than with the total optical path length.

REQUIREMENTS ON THE MICRO-OPTICAL COMPONENTS

There are a number of constraints which must be addressed in the design of an optical switch in accordance with the invention. Table 2 summarizes the optical constraints placed on the collimators, micromirrors, and actuators. Three different size switches are identified in Table 2.

TABLE 2

| Parameter | Commercial GRIN Lens Collimators | | |
|---|---|---|---|
| | 1.0 mm diameter $\sqrt{A} = 0.481$/mm | 2.0 mm diameter $\sqrt{A} = 0.237$/mm | 4.0 mm diameter $\sqrt{A} = 0.148$/mm |
| Collimators | | | |
| Effective focal length (mm) | 2.08 | 4.22 | 6.77 |
| Crossconnect size (input × output) | 121 × 121 | 625 × 625 | 1156 × 1156 |
| Collimator array width (mm) | 13.2 | 56 | 143 |
| Angular tolerance on individual collimators (mrad) | ±1.4 | ±0.69 | ±0.43 |
| Micromirrors | | | |
| Mirror size ($L_x \times L_y$, mm$^2$) | 1.0 × 0.8 | 2.1 × 1.6 | 3.4 × 2.5 |
| Minimum mirror radius of curvature (m) | 1 | 4 | 11 |
| Dynamic angular range (degrees) | 20 | 20 | 20 |
| Angular precision to direct beam to mirror on 2$^{nd}$ array (mrad) | ±0.70 | ±0.34 | ±0.21 |
| Mirror angular precision for ~40 dB mode overlap loss (mrad) | ±1.3 | ±0.89 | ±0.55 |
| Mirror angular precision for ~0.5 dB mode overlap loss (mrad) | ±0.12 | ±0.06 | ±0.04 |

TABLE 2-continued

| Parameter | Commercial GRIN Lens Collimators | | |
|---|---|---|---|
| | 1.0 mm diameter $\sqrt{A} = 0.481$/mm | 2.0 mm diameter $\sqrt{A} = 0.237$/mm | 4.0 mm diameter $\sqrt{A} = 0.148$/mm |
| Actuators | | | |
| Assumed actuator travel ($\mu$m) | 150 | 150 | 150 |
| Actuator precision to direct beam to mirror on 2$^{nd}$ array (nm) | ±300 | ±146 | ±90 |
| Actuator precision for ~0.5 dB mode overlap loss (nm) | ±52 | ±26 | ±17 |

Regarding the collimators, an effective focal length equal to $1/\sqrt{A}$ has been calculated for each GRIN collimator, so that it can be compared to standard lenses. Regarding the micromirrors, the micromirrors must satisfy very stringent requirements in order to position the optical beams precisely on the output collimators. The large beam waists used in the switches mean that the mirror sizes must be large, typically on the order of several millimeters. Such large mirrors may not be possible with some of the known surface micromachining techniques used in fabricating micromirrors. With a thickness of only a few microns, these known mirrors may not be able to maintain the desired flatness (radius of curvature) to ensure that the beam propagates without distortion. Fortunately, bonded wafer approaches are now becoming more common in the manufacture of micromachined components, so that it is less difficult to design a mirror having a thickness of 100 microns to several hundred microns. This thickness is necessary to ensure that the gold film used as a reflective coating on the mirrors does not cause undue curvature.

Each micromirror should rotate 10° around two perpendicular axes in order to couple any input fiber to any output fiber. However, the range of 10° may place difficult constraints on other components of the system, such as the actuators for manipulating the micromirrors. For the actuators which will be described fully below, a 10° movement of a 2 mm diameter mirror requires a mover to travel approximately 50 to 100 microns. This requirement limits the types of micromachined drives that can be utilized. In the preferred embodiment, electrostatic surface actuators are utilized.

Table 2 also includes three different angular position requirements for the micromirrors. An angular precision of ~0.5 mrad is required both to position the beam on the second micromirror array and to achieve ~40 dB coupling (i.e, a maximum overlap loss of ~40 dB) into the output fiber. The ~40 dB mode coupling level is selected because a sensor could be used to detect this signal level. At this signal level, the optical power of the output fiber itself could be used to close a control loop which positions the micromirrors. There is a significant benefit in performing the open loop control of the beam position on the second micromirror array. Otherwise, sensors are required along the area of the second micromirror array in order to steer the beam as it moves from one micromirror to another. Sensors may also be required to ensure that the beam is properly centered on the correct output micromirror. Similarly, if the precision for the ~40 dB mode overlap loss is not met, sensors are required to steer the beam onto the correct output collimator.

Briefly, with regard to the constraints involving the actuators, the micromirror properties identified above play an important role in determining the requirements of the actuators used to drive the micromirrors. For the preferred micromirror size and angular range, the actuators must travel a distance of approximately 100 microns. An actuator needs to be repeatedly positioned with an accuracy of ~0.1 microns in order to move the beam between the mirrors on the second array, to position the beam in the center of a particular mirror in that array, and to achieve ~40 dB coupling into the output fiber. This position accuracy can be provided by an electrostatic surface actuator.

PROPOSED MICROMIRROR DESIGN

Figure 6:
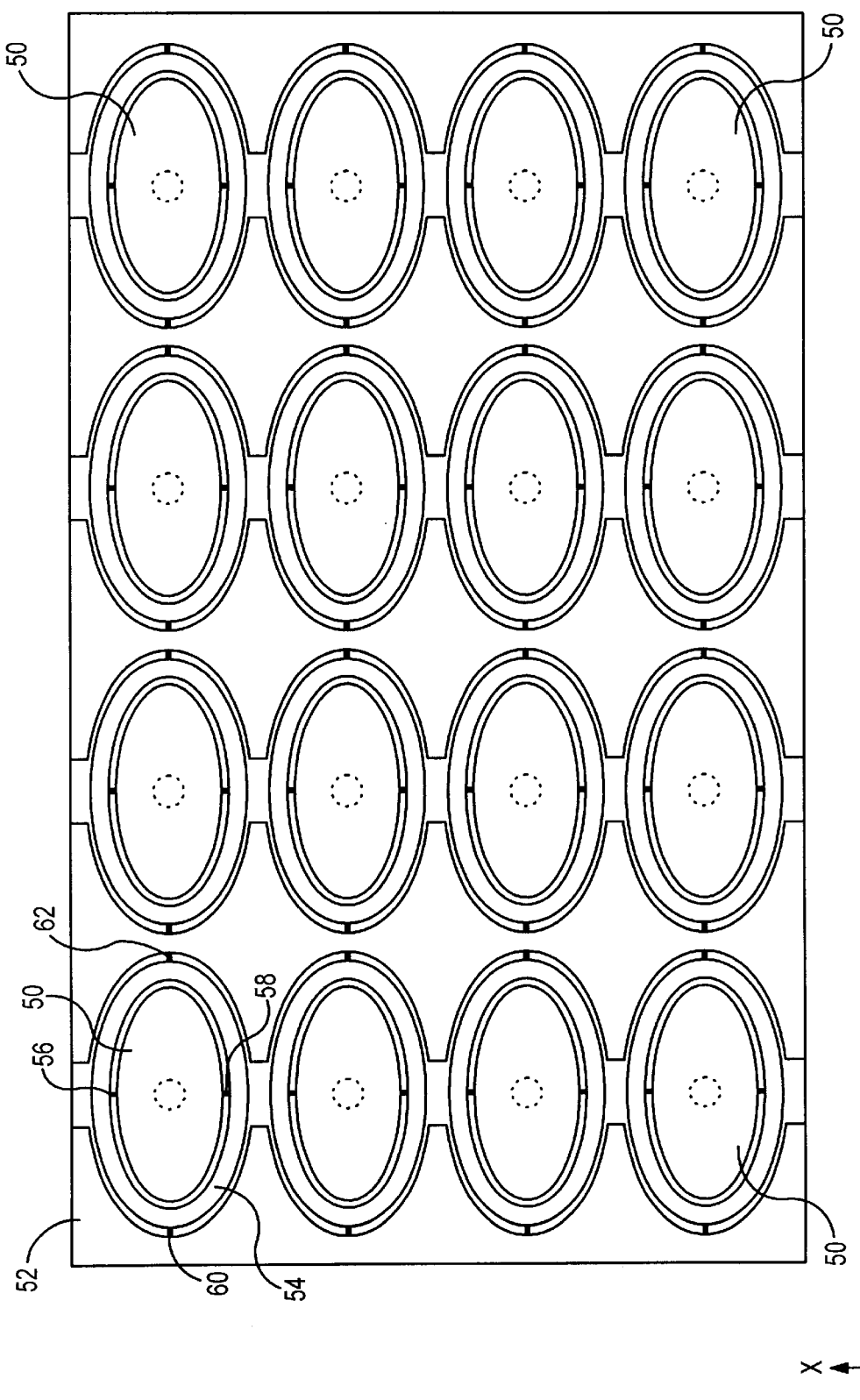
FIG. 6 is a top view of a micromirror array in accordance with one embodiment of the invention.
Figure 7:
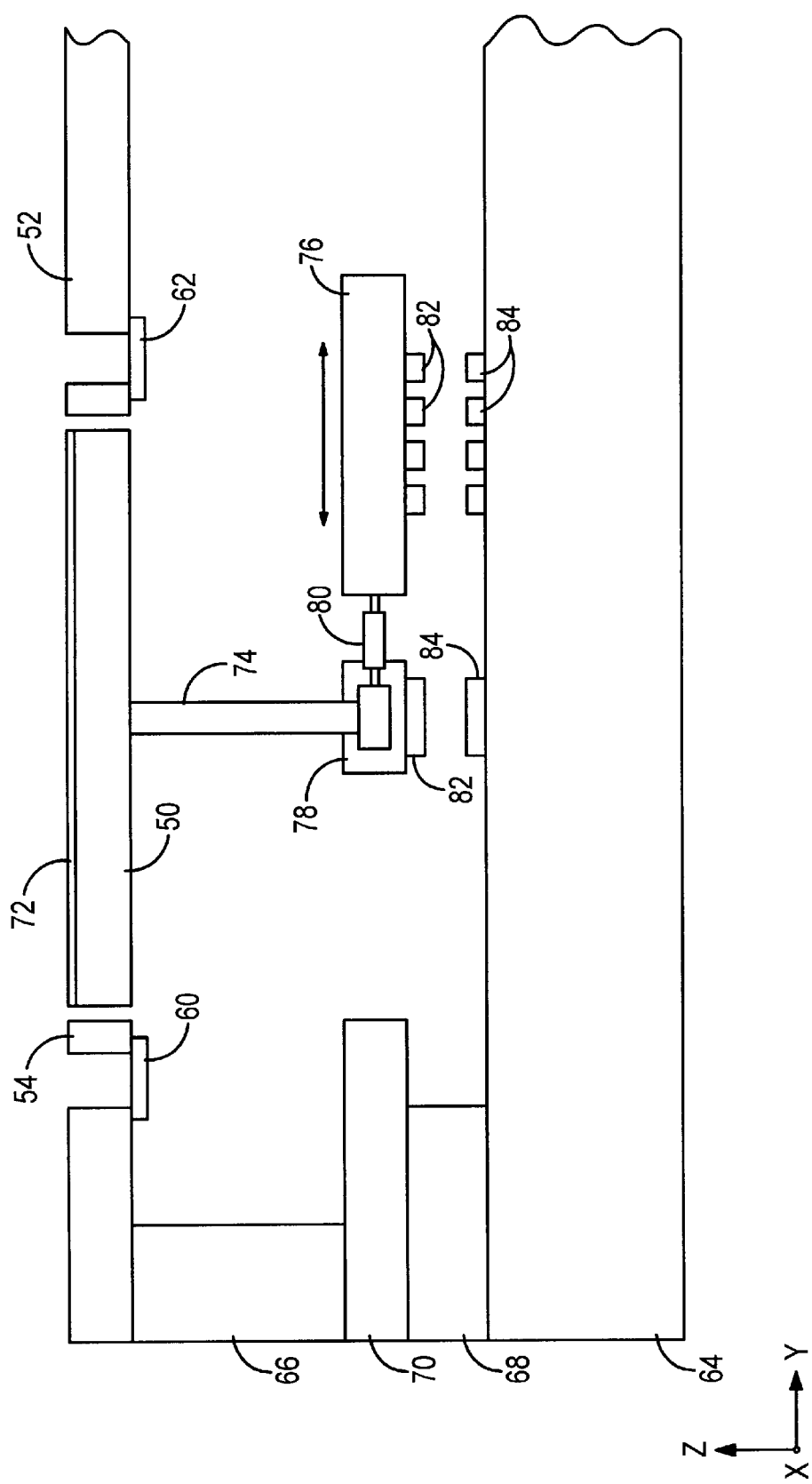
FIG. 7 is a side view of one of the micromirrors of FIG. 6 connected to a mover substrate having actuators for manipulating the micromirror about two axes.
Figure 7A:
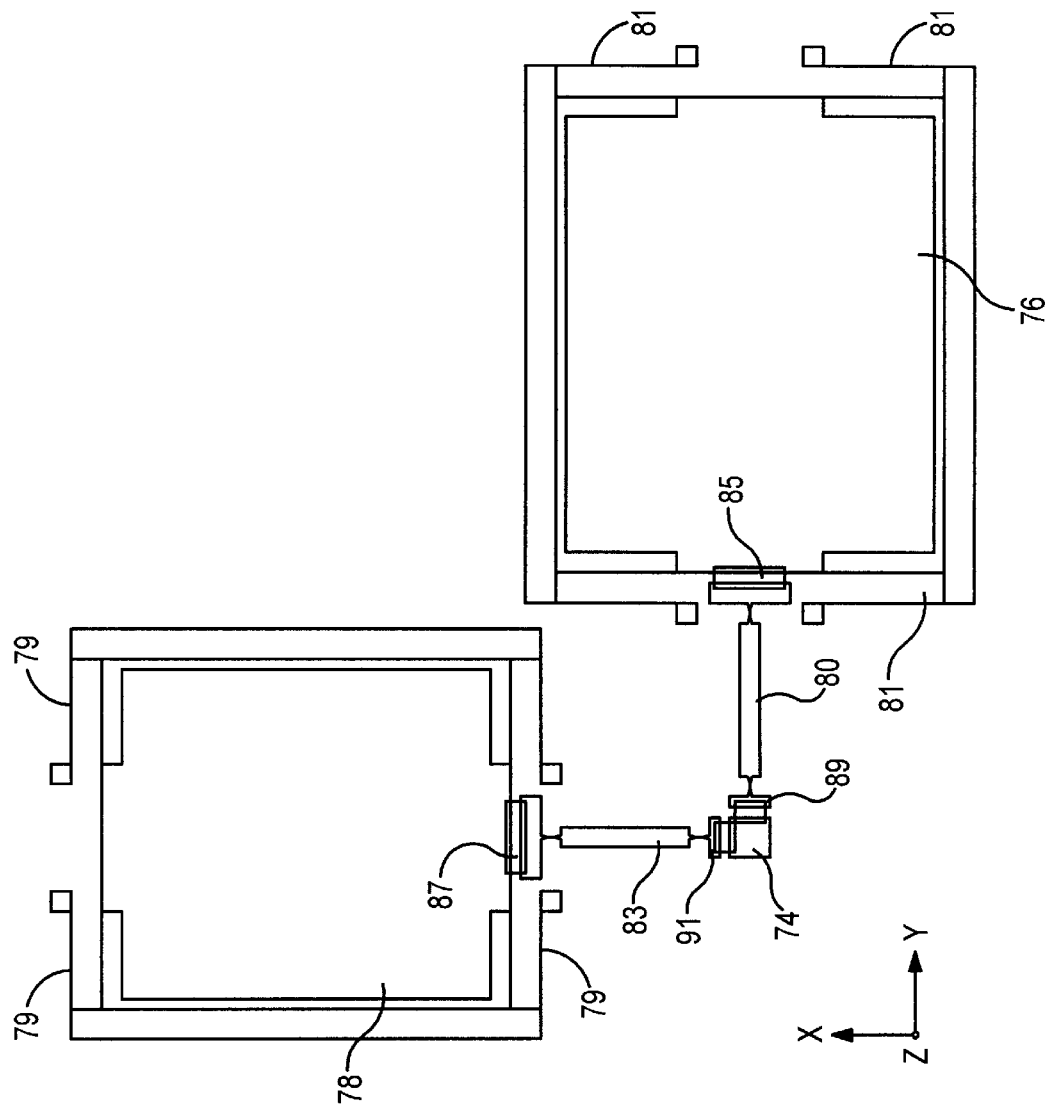
FIG. 7A is a top view that isolates the pair of actuators for manipulating the micromirror of FIG. 7.

FIG. 6 is a top view of an array of sixteen micromirrors 50 formed on a micromirror substrate 52. FIG. 7 is a side view of one of the micromirrors and the mechanism for manipulating the rotations of the micromirror. FIG. 7A is a top view of the mechanism for manipulating the micromirror rotations. Referring first to FIG. 6, each micromirror is coupled to a ring member 54 by first and second torsion bars 56 and 58. The positions of the torsion bars define the first axis of rotation of the mirror 50. In the orientation of FIG. 6, the first axis is a x axis. The ring member 54 is coupled to the substrate 52 by third and fourth torsion bars 60 and 62, which define the second axis (i.e., the y axis). Only the third and fourth torsion bars are visible in the side view of FIG. 7.

The torsion bars 56, 58, 60 and 62 are thin membrane flexures which are used to connect separate elements. Suitable materials for the twisting flexures would be silicon nitride, polysilicon, or single crystal silicon. The thickness of the flexures may be as small as approximately 1000 Å or as large as 100 $\mu$m. The particular choice of thickness depends on the required switching time. Silicon nitride films and polysilicon films are believed to have excellent resistance to cyclic fatigue. Because the torsion bars are only twisted within the elastic limits of the material, a particular movement by the actuators to be described below produces the same mirror position. When the torsion bars are in the relaxed condition, the micromirror 50 lies parallel to the fixed portion of the micromirror substrate 52.

In FIG. 7, it can be seen that the micromirror substrate 52 is coupled to a mover substrate 64. The means for coupling the two substrates is not critical to the invention. In FIG. 7, a silicon beam 66 is connected to a pair of intermediate layers 68 and 70. However, other mechanisms for attaching the substrates may be employed. The mirror 50 may have a thickness of approximately 100 microns. As previously noted, the mirror curvature is a significant concern because the beam path lengths are relatively long. For the 1000×1000 switch, the mirror radius of curvature needs to be greater than 11 m. Such a large radius of curvature is readily achievable because the mirror is relatively thick and is primarily comprised of single crystal silicon. A thin metal layer 72 is coated on the exposed surface of the silicon micromirror 50 to achieve the desired reflective properties. An acceptable metal is a gold film 72 having a maximum thickness of 2000 Å, so that the gold stress can be limited to less than 150 MPa for the mirror to have a curvature greater than 11 m. This stress control is straightforward when using many of the known deposition and annealing methods.

Extending downwardly from the mirror 50 is a projection 74. The use of the projection allows the micromirror to be manipulated in the same manner as a joystick-controlled device. That is, pressure applied to the projection 74 will cause rotation of the micromirror 50. The extent of rotation and the axis of rotation will depend upon the degree of movement and the direction of movement of the projection 74. A pair of movers 76 and 78 are used to control the movement of the projection 74. The mover 76 is shown as being coupled to the projection by a connector rod 80 that allows the projection to rotate as the mover is displaced linearly.

Actuating the mover 76 causes the micromirror 50 to rotate relative to the ring member 54 and the micromirror substrate 52. In FIG. 6, the rotation will be about the x axis defined by the torsion bars 56 and 58. The second mover 78 is electrostatically driven to displace the mover into and out of the illustration of FIG. 7. Thus, the displacement of the second mover 78 causes rotation of the ring member 54 (and consequently the micromirror 50) about the y axis defined by the torsion bars 60 and 62.

The motor used to rotate the micromirror 50 about one of the axes consists of two elements, a stator and a translator. In the embodiment of FIG. 7, the stator is the mover substrate 64 and there are two translators, i.e., the movers 76 and 78. However, a single mover may be used in some applications. For example, the end of the projection 74 may be coupled to a single mover that is electrostatically actuated to provide motion in either of two directions. The motor is described herein as a surface electrostatic actuator because the motion is parallel to the surfaces of the two elements and the force is generated by voltages applied to these surfaces. Surface electrostatic actuators are also described in U.S. Pat. No. 5,986,381 to Hoen et al., which is assigned to the assignee of the present invention.

FIG. 7A shows a top view of the two movers 76 and 78 and the means for connecting the movers to the projection 74. The movers are suspended above the surface of the mover substrate (not shown in FIG. 7A) by bending beam flexures which allow the movers to be shifted 100 $\mu$m in the desired direction of travel, but which contain the movers from movement in other directions. Each of the connector rods 80 and 83 must be stiff with respect to displacements along to the associated desired axis of travel, yet must be compliant to displacements that are normal to the desired axis of travel. For example, the connector rod 80 that is connected to the mover 76 must couple the displacements of the mover 76 directly to the projection 74, while accommodating both the displacements caused by the actuation of the second mover 78 and the tilt of the projection 74 which occurs as it is displaced. The connector rods 80 and 83 of FIG. 7A are linked to the movers 76 and 78 by first thin bending elements 85 and 87. Similarly, the connector rods are linked to the ends of the projection 74 by second thin bending elements 89 and 91. These bending elements accommodate some of the tilt of the projection. In addition, a region of each connecting mechanism is thinned so that it is relatively soft with respect to displacements initiated by actuation of the mover with which it is not associated. This thinned region is also relatively soft with respect to torsions, so that rotations of the projection can be accommodated.

The lower surfaces of the movers 76 and 78 include sets of electrodes 82. The sets of electrodes are generally aligned with sets of electrodes 84 along the surface of the substrate 64. By manipulating the voltage pattern of one of the two sets of electrodes associated with a mover, the mover can be actuated.

Figure 8:
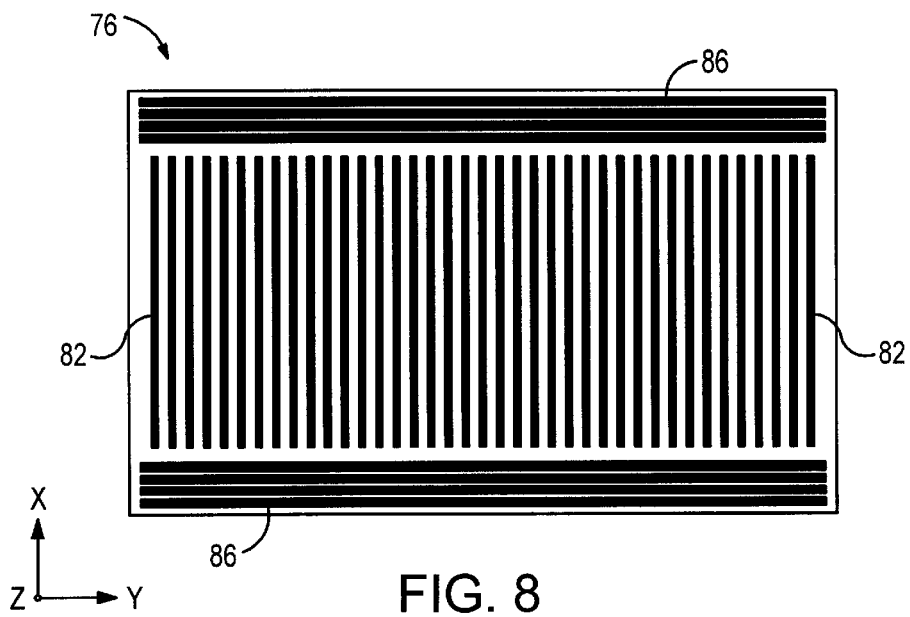
FIG. 8 is a bottom view of a mover of FIG. 7, showing vertically oriented driver electrodes and horizontally oriented levitator electrodes.

One embodiment of a pattern of electrodes on a mover 76 or 78 is shown in FIG. 8. The lower surface of the mover has two distinct sets of electrodes. In the orientation of FIG. 8, the drive electrodes 82 are shown as extending parallel to the x axis, while levitator electrodes 86 extend parallel to the y axis. Similar sets of electrodes are patterned in the corresponding areas of the mover substrate 64. The drive electrodes 82 are aligned perpendicular to the direction of travel and are used to position the mover in the direction of travel. When appropriate voltage patterns are applied to these drive electrodes, the electrodes create a set of potential wells that are periodic in the mover position.

Figure 9:
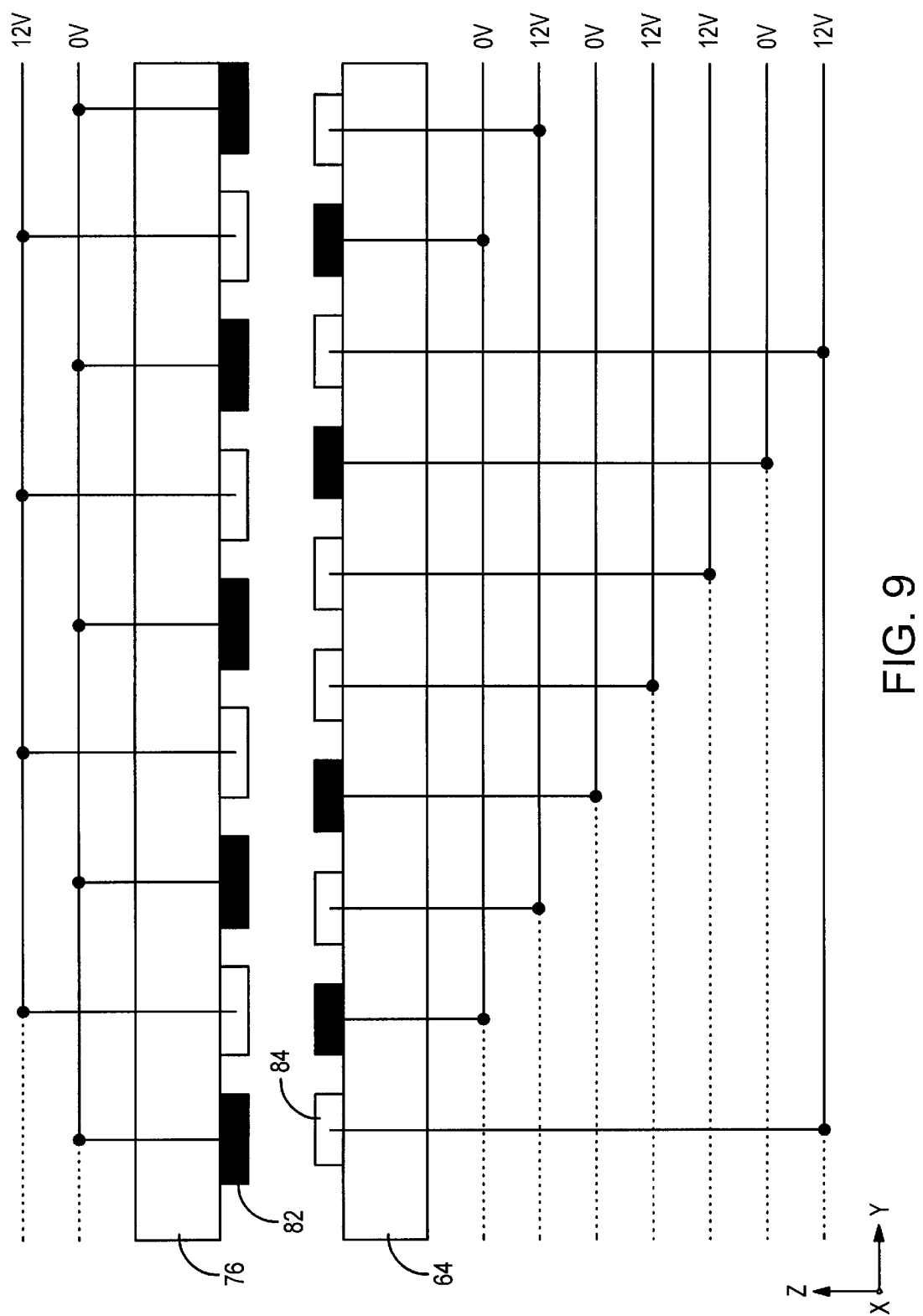
FIG. 9 is a side view of the mover and mover substrate of FIG. 7, showing voltage patterns along the drive electrodes at one particular time.

One voltage pattern for the drive electrodes is shown in FIG. 9. The electrodes are configured such that, for each six drive electrodes 82 on the mover 76, there are seven drive electrodes 84 along the substrate 64. The mover electrodes have a spatially alternating pattern of applied voltages. That is, if a given electrode is held at 12 V, then the nearest neighbor electrodes are held at 0 V. This pattern is repeated along the lower surface of the mover. A similar voltage pattern is applied to the substrate electrodes 84. However, the substrate voltage pattern contains a single disruption, i.e., a location where the alternating pattern breaks down. This disruption occurs once per every seven electrodes in this particular embodiment, but other arrangements may be substituted. To displace the mover 76, these disruptions are moved in one direction or the other. In FIG. 9, the disruption is formed by a central pair of electrodes that are both biased at 12 V. To move the disruption to the right, the electrode that is on the right in the central pair is switched from 12 V to 0 V. The disruption would now be formed by a pair of adjacent electrodes that are both biased at 0 V. In a similar fashion, the disruption can be successively moved to the right. Moving the disruption to the right causes the mover to be displaced to the left. The displacement step size is determined both by the electrode pitch along the mover and by the number of substrate electrodes in one group. Specifically, the displacement step size is the mover electrode pitch divided by the number of substrate electrodes in a group. For instance, if the mover pitch is 1 micron, switching the voltage pattern shown in FIG. 9 causes the translator to move by 0.143 microns.

An additional feature of this electrostatic drive is that the mover position depends linearly on the relative voltage applied to the disrupted electrode. For instance, if 35% of the drive voltage is applied to the disrupted electrode, then the translator moves 35% of the full step distance, or 50 nm in this case. It should be noted that changing the drive voltage uniformly for each electrode 82 and 84 does not change the position of the mover, since it merely changes the amount of force that the mover can apply. A second feature of this drive configuration is that it produces a very large force for a given voltage. The maximum force that can be applied by electrostatics is the force of attraction between two plates of a capacitor, i.e., $F_{cap} = -\epsilon_0 AV^2/(2d^2)$, where A is the surface area of the capacitor and d is the spacing between the plates. The force applied by this motor is ~25% of this maximum force and is applied laterally.

Figure 10:
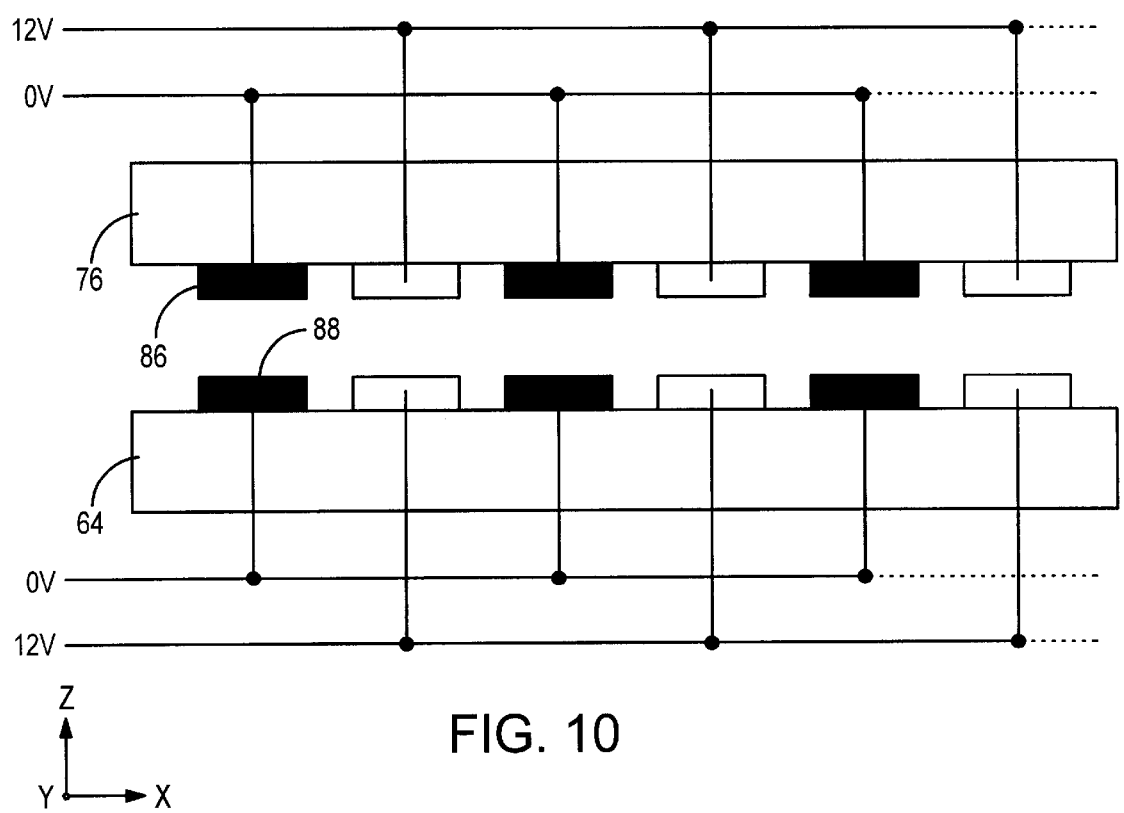
FIG. 10 is an end view of one arrangement of levitator electrodes on the mover and mover substrate of FIG. 7, showing possible voltage patterns along the levitator electrodes.

When energized, the drive electrodes 82 and 84 also apply a significant force of attraction between the mover 76 and the mover substrate 64. This attractive force would limit the range of travel if the drive electrodes were the only electrostatic element, because there is a narrow range of attractive forces for which the supporting flexures are stable. As previously noted, the mover 76 is preferably supported above the substrate 64 by flexures. Adding levitator (repulsive) electrodes to the system counteracts the attractive forces and allows a much greater range of motion and much greater lateral forces. One configuration of the levitator electrodes is shown in FIGS. 8 and 10. The levitator electrode pitch on the rotor (i.e., the mover 76) is identical to the levitator electrode pitch on the stator (i.e., the substrate 64). Voltage patterns are applied to both the rotor electrodes 86 and the stator electrodes (not shown), so that the biased electrodes on the rotor are positioned directly opposite to the biased electrodes on the stator. Similarly, the grounded electrodes on the two surfaces are positioned directly opposite to each other. By selecting the appropriate electrode voltages and electrode spacings, it is possible to generate a repulsive force between the two elements 64 and 76 by electrostatic voltages. This effect occurs because of the fringing fields between the electrodes. The levitator electrodes shown in FIGS. 8 and 10 generate as much as 30% of the maximum force generated by a similarly sized capacitor, and in this case, the force pushes the two elements directly apart. As previously noted, the levitator electrodes are aligned parallel to the direction of travel by the mover 76. Thus, the force that they apply is constant as the mover is displaced laterally.

Figure 11:
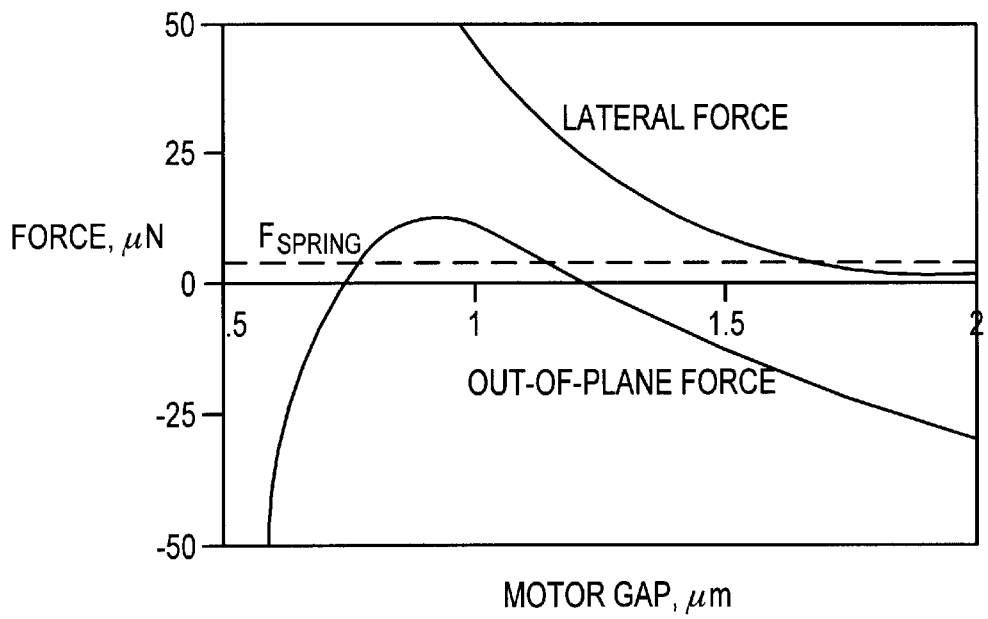
FIG. 11 shows graphs of lateral forces (i.e., in-plane forces) and out-of-plane forces for surface electrostatic drives having a surface area of 1 mm$^2$ and having both drive electrodes and levitator electrodes.
Figure 12:
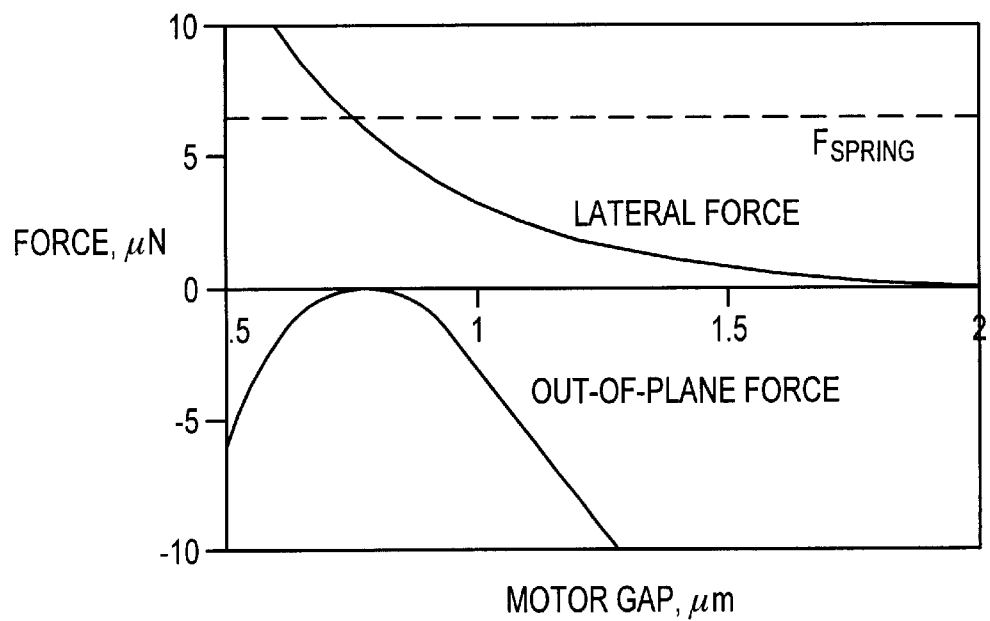
FIG. 12 shows graphs of lateral forces (i.e., in-plane forces) and out-of-plane forces when the 1 mm$^2$ drive includes only drive electrodes.

The effect of adding levitator electrodes 86 and 88 to the motor is shown graphically in FIGS. 11 and 12. The plot of FIG. 12 shows the lateral and out-of-plane forces as functions of the gap between the mover and the substrate for a mover having a surface area of 1 mm² and having 1 μm pitch substrate electrodes. In this calculation, it is assumed that the mover is supported by 500 μm long folded beam flexures that have a width of 1 μm and a thickness of 40 μm. A bias voltage of 1.75 V is the largest voltage that can be applied to the levitator electrodes before the mover becomes unstable and snaps down into the substrate. This instability is seen in the graph of FIG. 12 by the fact that the out-of-plane force is always negative, except at one point, where it is zero. In this marginally stable case, the lateral force is just large enough to deflect the springs 150 μm. Adding levitator electrodes to the drive significantly increases the available force and the travel. The graph of FIG. 11 shows the lateral and out-of-plane forces for a motor in which the 1 mm² area is evenly split between the levitator and drive electrodes. It should be noticed that even with an applied 12 V, the motor is positioned very stably at 1.25 μm. The lateral force the motor can apply is now four times greater than the force needed to deflect the flexures 150 μm.

The motor is expected to meet many of the performance requirements identified in the above tables. The position accuracy is determined almost completely by the average electrode pitch, which is fixed at the time of manufacture. Any changes in the flexural stiffness or the applied bias voltage produce very little effect. Thus, this motor should accurately and repeatably position the micromirror 50. Because of the efficiency of converting voltage to lateral force, the motor does not need to be very large, allowing the micromirrors to be very closely spaced. The lateral force shown in FIGS. 11 and 12 is sufficiently large to produce 10 g acceleration of the mover 76. Assuming that the mover is 100 μm thick and needs to travel 150 μm to position the micromirror, and assuming that the micromirror has an effective size that is approximately three times the mass of the mover, the time to position the micromirror without feedback would be approximately 5 ms. Thus, even with feedback to fine tune the position of the beam on the output collimator, the micromirror should be positioned within 10 ms. The overall design should be fairly shock tolerant, because the forces which position the mover can withstand accelerations up to 10 g. The power consumption should be fairly minimal, because the motor itself does not require power, unless it is actuated. It does, however, require a stable bias voltage. Some power is thus required to operate the associated CMOS electronics. The thermal stability should be good, because the actuator position relative to the substrate does not change as the mover and substrate electrode sets expand or contract. The micromirror angular position is determined by components which are all comprised of single crystal silicon, so that temperature changes should not affect the micromirror angle, as long as the temperature is uniform.

ALTERNATIVE EMBODIMENT

FIGS. 13–16 illustrate another embodiment of the invention. In this embodiment, one side of a micromirror 90 is supported relative to a substrate 92 by a frame 94. The structure of the micromirror may be identical to that described above. That is, the micromirror may be formed of single crystal silicon having a thickness of approximately 100 microns, with a thin coating (e.g., 2000 Å) of reflective material, such as gold. The micromirror is a dual axis device. The embodiment includes two movers 96 and 98 which move in parallel directions. However, other embodiments are contemplated. For example, the movers may be connected to the micromirror 90 such that the micromirrors follow perpendicular paths. In another embodiment, there is a single mover that can be displaced in perpendicular directions, depending upon the applications of electrostatic forces.

Each mover 96 and 98 is supported above the substrate 92 by three beam flexures 100, 102 and 104. Each beam flexure has an E shape, with end legs that are fixed to the substrate and a center leg that is fixed to the associated mover. The flexures may have a thickness of 2 $\mu$m and a depth of 100 $\mu$m.

Figure 13:
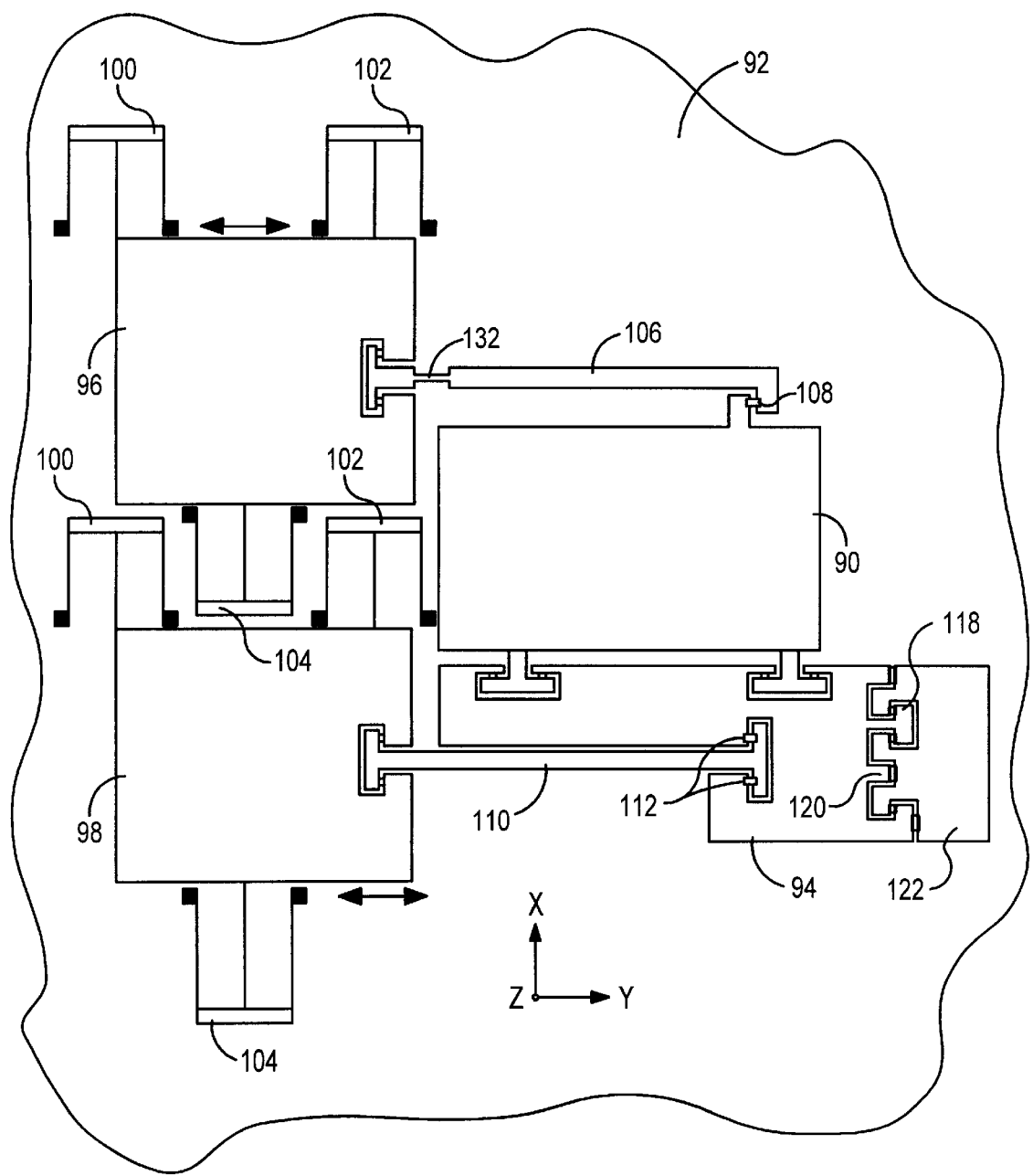
FIG. 13 is a top view of another embodiment of a micromachine having electrostatically driven movers which manipulate a micromirror about two axes.

The mover 96 is coupled to the micromirror 90 by a mirror drive rod 106 and a thin membrane flexure 108. Similarly, the mover 98 is connected to the frame 94 by a frame drive rod 110 and a pair of thin membrane flexures 112. The thin membrane flexures 108 and 112 are substantially identical to the torsion bars 56, 58, 60 and 62 described with reference to the embodiment of FIG. 2. The membrane flexures are formed on the upper surfaces of the rods 106 and 110. While not clearly shown in FIG. 13, additional membrane flexures are formed along the lower surfaces of the movers to attach the movers to the drive rods 106 and 110. Again, the material may be silicon nitride or polysilicon having a film thickness of approximately 1000 Å. The interlocking pattern of a hinge that connects the frame 94 to a support member 122, as shown in FIGS. 13 and 14, allows the hinge to be loaded in both compression and tension. That is, forces can be applied to the two sides of the hinge which tend to pull the two sides of the hinge apart, and forces can be applied to the hinge which tend to push the two sides of the hinge together. The illustrated hinge includes a T-shaped protrusion element 118 that operates well when the hinge is loaded under compression and includes a second protrusion element 120 that operates well when the hinge is loaded under tension.

As shown in FIGS. 14–16, the protrusion elements 118 and 120 of the hinge are coupled to the support member 122 by membrane flexures 124. The support member 122 is connected to the substrate 92 by a connection layer 126. A membrane flexure 128 is also used to connect the mover 98 to a hinged region 130 of the frame drive rod 110.

The micromirror 90 is shown in a rest position in FIG. 15. The surface electrostatic arrangement that drives the mover 98 includes a set of electrodes 114 on the mover and a second set of electrodes 116 on the substrate 92. The patterns of electrodes preferably are consistent with the patterns described with reference to FIG. 8. Thus, for every six mover electrodes 114, there are seven substrate electrodes 116. This is the preferred embodiment, but other arrangements may be utilized without diverging from the invention. The sets of electrodes 114 and 116 are drive electrodes. While not shown in FIGS. 15 and 16, the mover 98 and the substrate 92 also include levitator electrodes. The mover 96 of FIG. 13 includes a similar surface electrostatic arrangement for levitating and driving the mover.

When the mover 98 is in a rest position, the reflecting surface of the micromirror 90 lies parallel to the top surface of the mover. That is, the frame 94 and the micromirror are in the positions illustrated in FIG. 15. However, when the mover is energized by varying the voltage patterns along either or both of the sets of drive electrodes 114 and 116, the mover applies a force along the frame drive rod 110. By displacing the mover rightwardly, the force applied to the frame drive rod tends to pivot the frame 94 and the micromirror out of the plane of the mover. The membrane flexures 112, 124 and 128 allow the frame 94 to pivot to the out-of-plane position shown in FIG. 16. Preferably, the micromirror is able to rotate about at least 20° from the rest position of FIG. 15. More preferably, the rotation extends to at least 30°. In the most preferred embodiment, the rotation is extended to 45°.

Referring again to FIG. 13, the operation of the mover 96 is generally identical to the operation of the mover 98. However, there is some additional complexity. The flexural connection between the mirror drive rod 106 and the micromirror 90 is more difficult, since the connection between the mover 96 and the micromirror 90 must allow some twisting as the micromirror is tilted with respect to the frame 94 and with respect to the substrate 92. A relieved section 132 along the mirror drive rod 106 facilitates bending as the micromirror is tilted. It should be noted that the micromirror rotation by the mover 96 should not be initiated while the frame 94, the micromirror 90 and the frame drive rod 110 are coplanar, as shown in FIG. 15, since the frame drive rod will interfere with movement of the frame 94. Consequently, the micromirror should be tilted before the initial movement of the mover 96. Preferably, the mover 96 is able to rotate the micromirror 90 at least 20°. More preferably, the rotation is at least 30°.

OPERATION

The operation of the optical switch 10 of FIG. 1 using any of the embodiments of the dual axis micromirrors described above may include a combination of open and closed loop electronics. When a signal is received to move the input optical beam 30 from a first output fiber of the collimator array 14 to a second output fiber, the micromirror 22 in the first micromirror array 16 rotates along two axes and moves the optical beam 32 from the micromirror 26 in the second micromirror array 18 to a third micromirror 28. During the rotation of the micromirror 22, the beam 32 is caused to travel in areas of the second micromirror array 18 in which the beam will not impinge any intermediate micromirrors. As a result, optical crosstalk is avoided. This is possible because the micromirrors fill only 25% to 33% of the space of the micromirror array. During the movement of the beam, the micromirror associated with the second output fiber is manipulated along two rotational axes to receive the beam from the first micromirror 22 and to precisely reflect the beam to the second output fiber. Because the electrostatic surface actuators should have excellent precision and repeatability, these movements and positionings are possible using open loop electronics. This type of precision and range of motion is less likely with alternative drive mechanisms, such as comb drives, scratch drives, piezoelectric elements, or electrostatic gap closing drives. The beam is positioned onto the output optical fiber with a very precise incidence angle. Once the beam is positioned on the output fiber, the optical signal is monitored and used to fine tune the position of the micromirror, so as to optimize coupling.

FABRICATION

Figure 17:
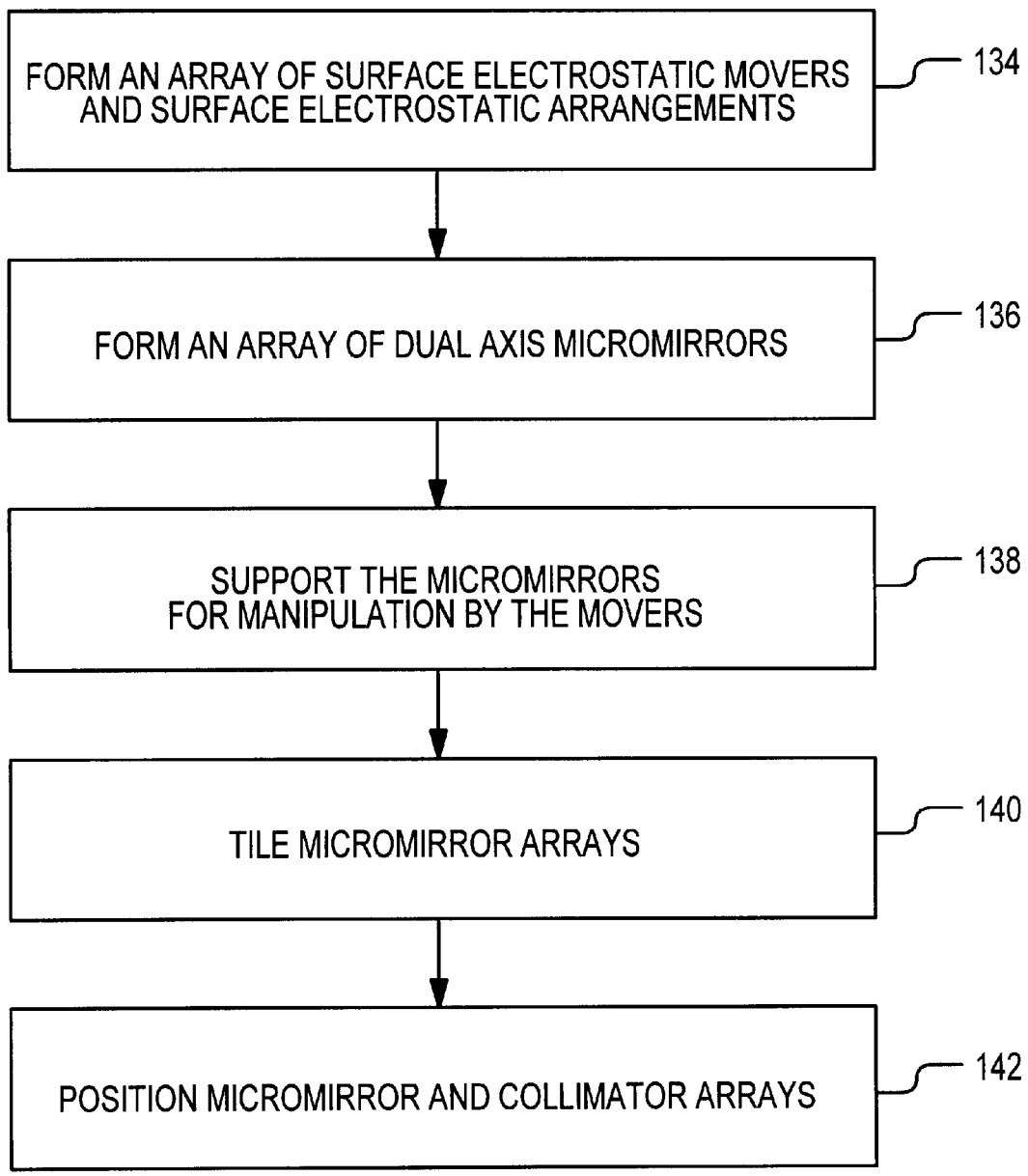
FIG. 17 is a process flow of steps for fabricating an optical switch in accordance with the invention.

Referring now to FIG. 17, the process of fabricating an optical switch in accordance with the invention includes a step 134 of forming an array of surface electrostatic movers. This step includes patterning surface electrostatic arrangements that enable the movers to be electrostatically manipulated. Surface electrostatic arrangements such as the type described with reference to FIGS. 8, 9 and 10 may be fabricated on surfaces of the movers and the substrate on which the movers are formed. In the preferred embodiment, the surface electrostatic arrangements include both drive electrodes and levitator electrodes.

In steps 136 and 138, an array of dual axis micromirrors is formed and is supported for manipulation by the movers. In the embodiment of FIGS. 13–16, the steps 136 and 138 are executed simultaneously, since the micromirrors and the movers are formed in common processing on the same substrate. On the other hand, in the embodiment of FIGS. 6 and 7, the steps are performed independently, since the movers and the micromirrors are fabricated on separate substrates that are subsequently connected to provide the assembly shown in FIG. 7.

A key feature of the design is that the micromirrors can be manufactured in 4×4 arrays (as one example) and then tiled together to produce an overall system. For instance, a 576×576 switch can be manufactured by tiling thirty-six 4×4 arrays. Thus, 4×4 arrays can be separately fabricated to build larger optical switches. In addition, using a 4×4 array as a basic unit, it is straightforward to provide a complete product line of switches. The tiling is possible because an individual micromirror only needs to be aligned to its associated fiber with a 25 micron tolerance. The individual mirrors of the array can accommodate any tilt introduced in the tiling process. Once the complete system is assembled, the individual mirrors can be calibrated, with the information stored in an electronic memory and shipped with the overall system controller.

The tiling step 140 in FIG. 17 may be executed with 4×4 arrays of micromirrors that are each 1.1 mm×1.5 mm. Micromirrors of these dimensions are suitable for steering beams with a waist of up to 320 $\mu$m. Thus, a single chip could be used to tile switches as large as 625×625. Tiling is possible because the lateral and angular alignments of the first and second arrays 16 and 18 of FIG. 1 are reasonably rudimentary. Lateral tolerances of ±25 microns should be possible and any angular misalignments can be compensated by the initial calibration of the assembled optical switch 10. Tiling allows the individual 4×4 arrays to be yielded separately and allows the switches to be much larger than a particular wafer size.

Step 142 is a step of positioning the arrays of micromirrors and the arrays of collimators to provide systems such as the one illustrated in FIG. 1. The calibration can then be performed. While the preferred embodiment of the optical switch includes electrostatically driven movers and includes a pair of micromirror arrays 16 and 18, other embodiments are contemplated. For example, the optical system may include two micromirror arrays, but the micromirrors may be manipulated about two axes using techniques other than those provided by surface electrostatic actuation.

What is claimed is:

1. A micromachine for steering optical signals comprising:

a substrate;

a micromirror supported adjacent to said substrate to enable movement of said micromirror relative to said substrate;

a first surface electrostatic arrangement operatively associated with said micromirror to selectively rotate said micromirror relative to said substrate in response to first electrostatic forces, said first surface electrostatic arrangement including first and second sets of electrodes configured and aligned to generate said first electrostatic forces in response to voltage patterns applied across said first and second sets; and a second surface electrostatic arrangement operatively associated with said micromirror to selectively rotate said micromirror relative to said substrate in response to second electrostatic forces, said second surface electrostatic arrangement including third and fourth sets of electrodes configured and aligned to generate said second electrostatic forces in response to voltage patterns applied across said third and fourth sets;

wherein rotations of said micromirror by operations of said first surface electrostatic arrangement follow angular paths that are separate from angular paths followed by said micromirror operations of said second surface electrostatic arrangement.

2. The micromachine of claim 1 wherein said first surface electrostatic arrangement includes a first mover that is reciprocally displaceable along a first path and that is operatively coupled to said micromirror to control rotation about a first axis as said first mover is displaced along said first path, said second surface electrostatic arrangement including a second mover that is reciprocally displaceable along a second path and that is operatively coupled to said micromirror to control rotation about a second axis as said second mover is displaced along said second path.

3. The micromachine of claim 2 wherein said second and fourth sets of electrodes are generally perpendicular to each other along a surface of said substrate, said first set of electrodes being formed on said first mover in general alignment with said second set, said third set of electrodes being formed on said second mover in general alignment with said fourth set.

4. The micromachine of claim 3 further comprising sets of levitation electrodes along each of said first and second movers and along corresponding locations on said surface of said substrate, said levitation electrodes being supplied with voltages in patterns configured to generate repulsive forces between said substrate and each of said first and second movers.

5. The micromachine of claim 2 further comprising a frame connected to support said micromirror, said first mover being coupled to manipulate said frame such that said micromirror is rotated about said first axis, said second mover being connected to said micromirror to manipulate said micromirror independently of said frame.

6. The micromirror of claim 1 further comprising a mirror-supporting substrate positioned generally parallel to said substrate, said micromirror being connected to said mirror-supporting substrate to accommodate rotations of said micromirror about first and second axes.

7. The micromirror of claim 6 wherein said mirror-supporting substrate includes flexible torsion bars which connect said micromirror to said mirror-supporting substrate, said micromirror being coupled to a projecting member that extends between said mirror-supporting substrate and said substrate, said projecting member being manipulated in response to said operations of said first and second surface electrostatic arrangements.

8. The micromirror of claim 1 wherein said micromirror is one of a plurality of substantially identical micromirrors along said substrate, each said micromirror being enabled to rotate about two axes and being operatively associated with dedicated first and second surface electrostatic arrangements.

9. The micromachine of claim 1 further comprising a controller connected to said first, second, third and fourth sets of electrodes to selectively vary voltage patterns applied across at least two of said sets, thereby selectively varying said first and second electrostatic forces.

10. An optical switch comprising:

a first array of first optical signal conductors;

a second array of first dual axis micromirrors that are individually manipulable, said first and second arrays being positioned such that each said first micromirror is dedicated to one of said first optical signal conductors to receive incident optical signals therefrom, each said first micromirror being mounted to enable manipulation about two axes of rotation;

a third array of second dual axis micromirrors that are individually manipulable, said second and third arrays being positioned such that said manipulation of any particular first micromirror reflects incident optical signals from said particular first micromirror to any one of a plurality of said second micromirrors, each said second micromirror being mounted to enable manipulation about two axes of rotation; and a fourth array of second optical signal conductors positioned relative to said third array such that each second micromirror is dedicated to direct incident optical signals to a uniquely associated one of said second optical signal conductors.

11. The optical switch of claim 10 wherein said first and fourth arrays are collimator arrays.

12. The optical switch of claim 10 wherein said second and third arrays include surface electrostatic actuators configured to individually manipulate said first and second micromirrors in response to electrostatic forces.

13. The optical switch of claim 12 wherein each said first and second micromirror is uniquely associated with two surface electrostatic actuators that generate electrostatic forces for rotations about first and second axes, respectively.

14. The optical switch of claim 10 wherein each said second and third array includes a substrate on which said first and second micromirrors are microfabricated.

15. A method of fabricating optical micromachines comprising the steps of:

providing a substrate;

forming a plurality of surface electrostatic movers on said substrate such that said movers are independently manipulable in response to electrostatic forces; and supporting a plurality of micromirrors relative to said substrate such that each said micromirror is rotatable about substantially perpendicular first and second axes and such that manipulations of said electrostatic movers cause rotations of said micromirrors about said first and second axes.

16. The method of claim 15 wherein said step of supporting and micromirrors includes positioning said micromirrors relative to said electrostatic movers such that each said micromirror is uniquely associated with at least one of said electrostatic movers.

17. The method of claim 15 wherein said step of supporting said micromirrors includes fabricating frames on said substrate and includes fabricating said micromirrors on said substrate such that said micromirrors are supported by said frames, said electrostatic movers thereby being integrated with said frames and said micromirrors.

18. The method of claim 15 wherein said step of supporting said micromirrors includes forming said micromirrors on a second substrate and attaching said second substrate to said substrate on which said electrostatic mirrors are formed.

19. The method of claim 15 wherein said step of forming said electrostatic movers includes patterning first sets of electrodes on a surface of said substrate and includes patterning a second set of electrodes on a surface of each electrostatic mover.

* * * * *